United States Patent Office 3,652,671
Patented Mar. 28, 1972

3,652,671
PROCESS FOR MAKING A CATIONIC
METHACRYLAMIDE
Benny G. Barron, Lake Jackson, Tex., assignor to The
Dow Chemical Company, Midland, Mich.
No Drawing. Filed June 1, 1970, Ser. No. 42,502
Int. Cl. C07c *103/30*
U.S. Cl. 260—561 N                                    10 Claims

ABSTRACT OF THE DISCLOSURE

N-(dialkylaminoalkyl)methacrylamides are prepared by thermally decomposing the corresponding N-(dialkylaminoalkyl)-2-methyl-β-alanine. The latter compound can be made by reacting methacrylic acid with an N,N-dialkylalkylenediamine. The substituted methacrylamide product is a useful cationic monomer for making flocculants, paper pulp additives, and the like.

BACKGROUND OF THE INVENTION

The present invention relates to a chemical process for making useful cationic vinyl monomers.

Polymers having cationic substituents on the polymer chain are useful as flocculating agents and additives for other such purposes in aqueous systems. Copolymers of acrylamide with vinyl monomers having amino substituents are of particular interest in this general area.

It is known that N-substituted amides can be made by thermally decomposing an amine salt of an acid. The yield of amide and hence the practicality of the reaction in a specific case depends upon the amine and the acid involved. In some cases, a fairly good yield of the substituted amide can be obtained by this reaction, but in many instances, side reactions interfere to such an extent that the method is of no practical use.

It is also known that an ester of acrylic or methacrylic acid reacts with two moles of an amine to form the corresponding N-alkyl-3-(alkylamino)propionamide which can be cleaved by a strong mineral acid at elevated temperatures to produce the N-alkylacrylamide. However, this acidic pyrolysis typically produces a tarry or gummy reaction mixture from which it is difficult to separate a good yield of pure product.

SUMMARY OF THE INVENTION

It has now been found that the Michael adduct of methacrylic acid and an N,N-dialkylalkylenediamine, that is, the N - (dialkylaminoalkyl) - 2 - methyl-β-alanine, is readily and essentially completely decomposed and rearranged by heating at 140–230° to produce a high yield of the N-(dialkylaminoalkyl)methacrylamide. The reaction is shown by the following equation:

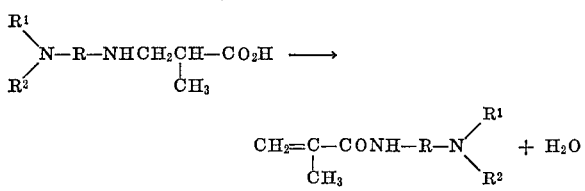

In the above formulas, R represents an alkylene radical of 2–6 carbon atoms and $R^1$ and $R^2$ are each alkyl radicals of 1–3 carbon atoms.

Conveniently, the starting material in the above reaction is made by the Michael reaction, that is, the addition of an active hydrogen compound to an activated olefinic bond. In the present case, methacrylic acid is reacted with the amine ($R^1R^2NRNH_2$) by heating the mixture in about equal molar proportions at about 100–150° C. until the major proportion of the reactants has combined to form the adduct. Usually some amine salt is also present in the mixture.

DETAILED DESCRIPTION

The present invention can be and preferably is essentially a unitary operation wherein the methacrylic acid and the substituted alkylenediamine are combined and the mixture is subjected to successively higher temperatures, first at 100–150° C. until the mixture is largely the Michael adduct and then this mixture is heated to a maximum of about 230° C. Preferably, the first stage is carried out at 120–130° C. with a heating time of approximately 0.1–2 hours and then the second stage of heating is at 180–220°, usually for 1–5 hours depending upon the maximum reaction temperature used. Water of reaction is distilled or flashed from the mixture during the decomposition step and this can be condensed and collected to constitute a convenient indicator of the progress of the reaction.

Alternatively, the Michael adduct can be isolated and purified if desired, for example, by recrystallization. The purified adduct can then be decomposed by further heating as described above.

The Michael adduct is, of course, obtainable by means other than the Michael reaction although that is usually the best way to make it. Another source is the reaction of the substituted diamine with 3-chloro-2-methylpropionic acid.

The present invention affords a means whereby a valuable cationic monomer is easily made under moderate reaction conditions without need for excess of any starting material or for any acidic catalyst or other reactant which can cause side reactions and from which the product has to be separated. The monomer is obtained in good yield by vacuum distillation or other conventional means of separation from the reaction mixture. The product is particularly valuable as a comonomer for making water-soluble copolymers of acrylamide which are useful as flocculants for settling aqueous suspensions, as drainage aids in paper pulp suspensions, and as aids for retention of pigments in papermaking.

N,N-dialkylalkylenediamines, which are useful in the practice of the invention include:

N,N-dimethylethylenediamine
N,N-diethylethylenediamine
N,N-dimethyl-1,3-propanediamine
N-methyl-N-ethyl-1,3-propanediamine
$N^1$-methyl-$N^1$-propyl-1,4-butanediamine
N,N-dimethyl-1,6-hexanediamine, and
$N^1,N^1$-diethyl-1,5-pentanediamine In each case, the reaction with methacrylic acid by the present process yields the N-(dialkylaminoalkyl)methacrylamide corresponding to the starting diamine.

Surprisingly, although good yields are obtained with methacrylic acid adducts in this process, the corresponding adducts of acrylic acid give poor results with side reactions predominating. The reaction mixtures produced by heating these adducts are largely byproducts and tarry materials and only small quantities of the desired acrylamide can be separated from them.

The heating steps of the process, that is, both the formation of the Michael adduct and the thermal decomposition of that adduct are preferably carried out in the presence of an inhibitor of vinyl polymerization in order to minimize or prevent polymerization of methacrylic acid in the first step and of the substituted methacrylamide product in the second step. High boiling phenols and aromatic amines are preferred for the purpose and typical examples of such inhibitors are N,N'-diphenyl-p-phenylenediamine, p-methoxyphenol, and phenothiazine. Both heating steps and particularly the step wherein the Michael adduct is thermally decomposed are also preferably carried out in the substantial absence of atmospheric oxygen to minimize polymerization and to prevent oxidation of the amine. A blanket of inert gas, usually nitrogen, is effective for the purpose. Bubbling the inert gas through the reaction mixture also facilitates removal of the water of reaction.

The process can be carried out in a high boiling inert solvent but the use of a solvent is not beneficial Aliphatic and aromatic hydrocarbons such as kerosine and biphenyl and aromatic ethers such as diphenyl ether are examples of solvents which can be employed if desired.

EXAMPLE 1

A mixture of 43 g. of methacrylic acid and 0.1 g. of N,N'-diphenyl-p-phenylenediamine was stirred while 44 g. of N,N-dimethylethylenediamine was added over a 30 minute period. The resulting product, largely the amine salt, was then heated for 10 minutes at 140–145° C. Infrared analysis of the product showed it to be about 85 percent Michael adduct, N-[2-(dimethylamino)ethyl]-2-methyl-$\beta$-alanine, and about 15 percent amine salt of methacrylic acid. The reaction product was heated to 120°–130° C. for 30 minutes. Upon cooling the solution, crystalline Michael adduct precipitated.

A portion of the reaction mixture (44.6 g.) was melted at 120° C. and poured into three times its volume of ethyl acetate. The crystalline adduct which precipitated was filtered and vacuum dried at 60° C. to obtain 53.7 percent of the theoretical quantity of adduct as hygroscopic crystals melting at 164–166.5° C.

This adduct (22.4 g.) and 0.05 g. of N,N-diphenyl-p-phenylenediamine were charged to a glass reactor equipped with nitrogen sparge and distillation column. Air was displaced with nitrogen and the charge was melted. The temperature was raised slowly to 180°–210° C. while maintaining a slow nitrogen sparge. During this period 3 g. of aqueous distillate was collected. The crude reaction product contained an estimated 60 percent of N-(2-dimethylaminoethyl)methacrylamide. This was confirmed by vapor phase chromatography analysis.

EXAMPLE 2

A mixture of 688.8 g. of methacrylic acid and 4 g. of N,N'-diphenyl-p-phenylenediamine was made up in a 2 liter flask equipped with stirrer, distillation column, dropping funel, and thermometer. The mixture was stirred while 705.6 g. of N,N-dimethylethylenediamine was added over a 45 minute period. The reaction mixture temperature was held below 90° C. by cooling during the addition. The dropping funnel was then replaced by a nitrogen sparge tube and nitrogen was bubbled through the mixture while it was heated at 150–165° C. for 4 hours. Water and some low boiling organic material were removed through the distillation column during this time. The temperature was then raised to 220° C. for an hour and the product was cooled and distilled under reduced pressure to obtain 881 g. of N-(2-dimethylaminoethyl)methacrylamide, representing a 71% yield based on the starting materials. The product was a yellow liquid, B.P. 130° C./15 mm.

EXAMPLE 3

Using the procedure of Example 2, a mixture of 688.8 g. of methacrylic acid and 817.6 g. of N,N-dimethyl 1,3-propanediamine was heated in the presence of 8 g. of N,N'-diphenyl-p-phenylenediamine at 220° C. to yield 955 g. of distilled N-(3-dimethylaminopropyl)methacrylamide, a yield of 69% of the theoretically obtainable quantity. The product was a yellow liquid boiling at 130° C./2 mm.

When a mxture of equal molar amounts of acrylic acid and N,N-dimethylethylenediamine was heated in the presence of N,N'-diphenyl-p-phenylenediamine as described in Examples 2 and 3, the N-(2-dimethylaminoethyl)acrylamide separable by distillation from the reaction mixture amounted to only 14% of the theoretically obtainable product.

I claim:
1. A process for making a substituted methacrylamide of the formula

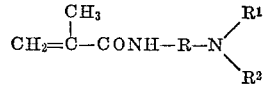

wherein R is an alkylene radical of 2–6 carbon atoms and each of $R^1$ and $R^2$ is an alkyl radical of 1–3 carbon atoms, which process comprises subjecting a compound of the formula

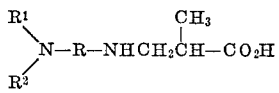

to a temperature of 140–230° C. for a time sufficient to convert at least a substantial portion of the compound to said substituted methacrylamide.

2. The process of claim 1 wherein the temperature is 180–220° C.

3. The process of claim 1 wherein R is an ethylene radical and $R^1$ and $R^2$ are methyl radicals.

4. The process of claim 1 wherein the compound is heated in the presence of an inhibitor of vinyl polymerization.

5. The process of claim 4 wherein the compound is heated in the absence of atmospheric oxygen.

6. A process for making a substituted methacrylamide of the formula

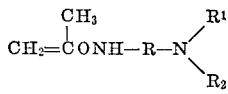

wherein R is an alkylene radical of 2–6 carbon atoms and $R^1$ and $R^2$ are each alkyl radicals of 1–3 carbon atoms, which process comprises forming a mixture of about equal molar amounts proportions of methacrylic acid and a diamine of the formula

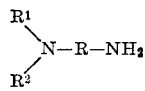

heating said mixture at 100–150° C. until the major portion of the methacrylic acid and the diamine have combined to form the Michael adduct, and then heating the reaction mixture thereby formed at 140–230° C. for a time sufficient to convert at least a substantial portion of the Michael adduct to the substituted methacrylamide.

7. The process of claim 6 wherein the mixture of diamine and methacrylic acid is heated at 120–130° C. and the Michael adduct is heated at 180–220° C.

8. The process of claim 6 wherein the diamine is N,N-dimethylethylenediamine.

9. The process of claim 6 wherein the reaction mixture throughout is heated in the presence of an inhibitor of vinyl polymerization.

10. The process of claim 9 wherein atmospheric oxygen is excluded from contact with the reaction mixture.

References Cited

Erickson, J., Journ. Amer. Chem. Soc., vol. 74, Dec. 20, 1952, pp. 6281–2.

LEWIS GOTTS, Primary Examiner

E. G. LOVE, Assistant Examiner

U.S. Cl. X.R.

162—168; 260—29.6, 534 C